(12) United States Patent
Raynauld

(10) Patent No.: US 7,140,953 B1
(45) Date of Patent: Nov. 28, 2006

(54) APPARATUS FOR TREATING EDGES OF PANELS AND METHOD

(75) Inventor: Roger Raynauld, Terrebonne (CA)

(73) Assignee: Bromer Inc., Terrebonne (CA)

(*) Notice: Subject to any disclaimer, the term of this patent is extended or adjusted under 35 U.S.C. 154(b) by 0 days.

(21) Appl. No.: 11/169,883

(22) Filed: Jun. 30, 2005

(51) Int. Cl.
*B24B 1/00* (2006.01)

(52) U.S. Cl. .......................... 451/57; 451/44

(58) Field of Classification Search .......... 451/41, 451/44, 57, 261, 262, 256
See application file for complete search history.

(56) References Cited

U.S. PATENT DOCUMENTS

| | | | | |
|---|---|---|---|---|
| 2,022,530 | A * | 11/1935 | White | 451/44 |
| 3,111,790 | A * | 11/1963 | Vegors et al. | 451/256 |
| 5,146,715 | A * | 9/1992 | Bando | 451/11 |
| 5,185,959 | A * | 2/1993 | Ikola et al. | 451/178 |
| 5,295,331 | A * | 3/1994 | Honda et al. | 451/44 |
| 5,409,417 | A * | 4/1995 | Bando | 451/9 |
| 5,545,277 | A * | 8/1996 | Hashemi et al. | 156/106 |
| 6,091,078 | A * | 7/2000 | Codama | 257/40 |
| 6,306,015 | B1 | 10/2001 | Bushell | |

OTHER PUBLICATIONS

*Fully automatic arrissing / seaming lines*, as found on Ashton Industrial website http://ashton-industrial.com/page.php?id=29.

*Standalone diamond single belt machines*, as found on Ashton Industrial website http://ashton-industrial.com/page.php?id=33.

*Castor tables, water baths tables & articulated arms*, as found on Ashton Industrial website http://ashton-industrial.com/page.php?id=2.

\* cited by examiner

*Primary Examiner*—Lee D. Wilson
*Assistant Examiner*—Anthony Ojini
(74) *Attorney, Agent, or Firm*—Ogilvy Renault LLP

(57) ABSTRACT

An apparatus for treating edge surfaces of panels, comprises conveyor tables to displace panels in sequence, two of the conveyor tables being configured such that panels are sequentially displaced in longitudinal alignment between the two conveyor tables with a longitudinal edge first. Two other of the conveyor tables are configured such that panels are sequentially displaced in lateral alignment between the two other conveyor tables with a lateral edge first. A first tool is positioned between the two conveyor tables. A second tool is positioned between the two other conveyor tables. Securing devices are associated with the conveyor tables to releasably secure panels in lateral alignment on the two conveyor tables such that the first tool is actuatable to simultaneously treat a longitudinal edge surface of a first and second panel on opposite sides of the first tool on the two conveyor tables, and to releasably secure panels in longitudinal alignment on the two other conveyor tables such that the second tool is actuatable to simultaneously treat a lateral edge surface of a first and second panel on opposite sides of the second tool on the two other conveyor tables.

5 Claims, 13 Drawing Sheets

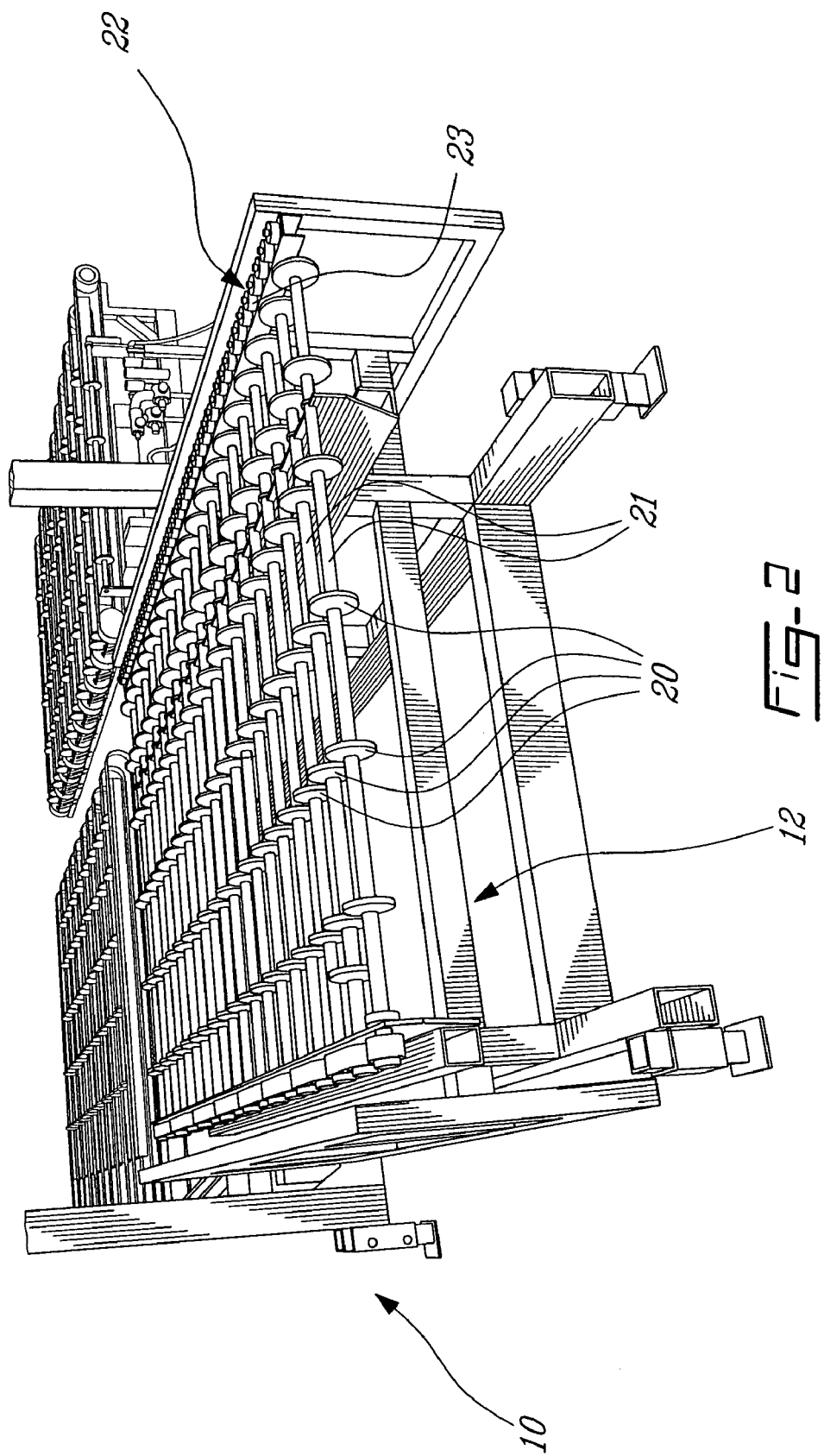

APPARATUS FOR TREATING EDGES OF PANELS AND METHOD

BACKGROUND OF THE INVENTION

1. Field of the Invention

The present invention relates to automated machinery and, more particularly, to an apparatus for treating edges of panels such as glass panels, for instance in edge deletion, border grinding, arrissing, edge seaming, in product application on the edges.

2. Background Art

Various types of materials are in the form of panels at some point in their processing. For instance, glass panels are used in windows, wood panels are commonplace in the construction industry, etc.

Panels are difficult to handle due to their relative large sizes with respect to their thickness, and due to the relative fragility associated with their thickness. In manufacturing, panels are therefore often displaced on conveyors upon which they lie flat, which facilitates their displacement.

It is often required to perform work on panels. For instance, panels of raw material (e.g., glass, wood, metal) are regularly subjected to steps of edge deletion, border grinding, arrissing, edge seaming, so as to remove or smoothen rough edges. Automated equipment has been designed for such tasks.

Due to the size of the panels, the automated equipment is often bulky. This results in issues pertaining to floor space in plants. Moreover, the treatment of each panel edge one after the other can result in the slowing down of a production line.

SUMMARY OF INVENTION

It is therefore an aim of the present invention to provide an apparatus that addresses issues associated with the prior art.

It is a further aim of the present invention to provide a method that addresses issues associated with the prior art.

It is a still further aim of the present invention to provide a tool for treating edges that addresses issues associated with the prior art.

Therefore, in accordance with the present invention, there is provided an apparatus for treating edge surfaces of panels, comprising: conveyor tables to displace panels in sequence, two of the conveyor tables being configured such that panels are sequentially displaced in longitudinal alignment between said two conveyor tables with a longitudinal edge first, two other of the conveyor tables being configured such that panels are sequentially displaced in lateral alignment between said two other conveyor tables with a lateral edge first; a first tool positioned between said two conveyor tables; a second tool positioned between said two other conveyor tables; and securing devices associated with said conveyor tables to releasably secure panels in lateral alignment on said two conveyor tables such that the first tool is actuatable to simultaneously treat a longitudinal edge surface of a first and second panel on opposite sides of said first tool on said two conveyor tables, and to releasably secure panels in longitudinal alignment on said two other conveyor tables such that the second tool is actuatable to simultaneously treat a lateral edge surface of a first and second panel on opposite sides of said second tool on said two other conveyor tables.

Further in accordance with the present invention, there is provided a method for treating edge surfaces of panels, comprising the steps of: i) displacing a sequence of panels such that an edge surface of a first pair of panels are on opposite sides of a path of a first tool; ii) releasably securing the first pair of panels in an aligned position with respect to the path of the first tool; and iii) actuating the first tool along the path such that the first tool treats the edge surfaces of the first pair of panels simultaneously.

Still further in accordance with the present invention, there is provided an apparatus for sanding edges of a pair of panels, with the panels being spaced apart with respective edge surfaces generally parallel, the apparatus comprising: a casing system sized so as to move along a path between the panels and having openings for receiving edge surfaces of panels therein; a first abrasive band within the casing system, the first abrasive band inclined with respect to the panels and actuatable in cyclical motion so as to contact a first-face edge of a first panel and a second-face edge of a second panel in the casing system; a second abrasive band within the casing system and obliquely positioned with respect to the first abrasive band, the abrasive band being actuatable in cyclical motion so as to contact a second-face edge of the first panel and a first-face edge of the second panel in the casing system; and an actuator to displace the apparatus along the edges of the panels to sand the edges longitudinally.

BRIEF DESCRIPTION OF THE DRAWINGS

Having thus generally described the nature of the invention, reference will now be made to the accompanying drawings, showing by way of illustration a preferred embodiment thereof and in which:

FIG. 2 is a perspective view of a first table of the apparatus of FIG. 1A;

DESCRIPTION OF THE PREFERRED EMBODIMENTS

Figure 1A:
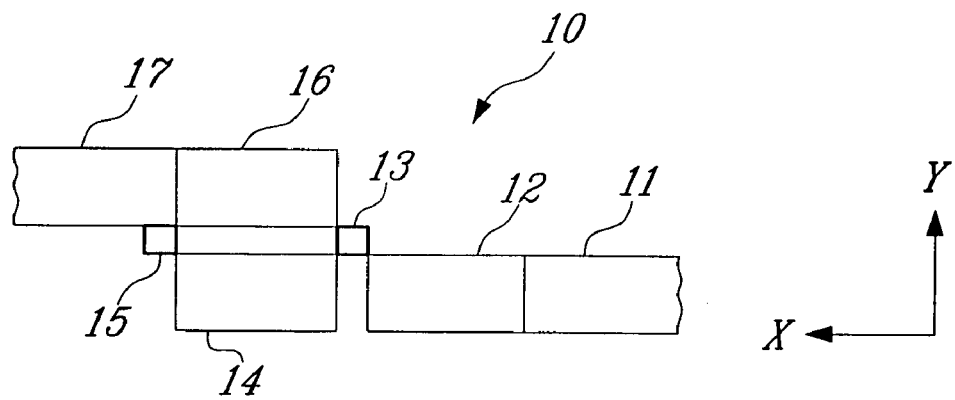
FIG. 1A is a schematic plan view of the apparatus for treating edges of panels in accordance with an embodiment of the present invention.

Referring now to the drawings, an apparatus for treating edges of panels is generally illustrated at 10 in FIG. 1A. The apparatus 10 is schematically illustrated, in order to better illustrate the sequence of operations in the treatment of the edges of panels in the apparatus 10.

The apparatus 10 is positioned between an upstream conveyor 11 and a downstream conveyor 17. The upstream conveyor 11 provides a feed of panels ready to have their edges treated. The downstream conveyor 17 receives the panels that have been treated in the apparatus 10, and direct these panels to downstream stations (e.g., packaging or further processing). For simplicity purposes, the panels with be described as having a pair of longitudinal edge surfaces (or front and rear edge surfaces), and a pair of lateral edge surfaces (or first and second lateral sides). It is pointed out that reference to longitudinal and lateral is not associated with a size of the edge surfaces—a lateral edge surface can be longer that a longitudinal edge surface for the apparatus 10.

The apparatus 10 has a first table 12, a second table 14 and a third table 16. The tables 12, 14 and 16 are typically conveyor tables that are actuatable to displace panels along the X and/or Y axes, as will be described hereinafter. As will be described hereinafter, a preferred sequence of actuation of tools 13 and 15 has one tool moving toward an axis of displacement of the other tool, while the other tool moves away from an axis of displacement of the first tool.

A Y-axis tool 13 is displaceable back and forth along the Y axis, between the first table 12 and the second table 14. An X-axis tool 15 is displaceable back and forth along the X axis, between the second table 14 and the third table 16.

Figure 1B:
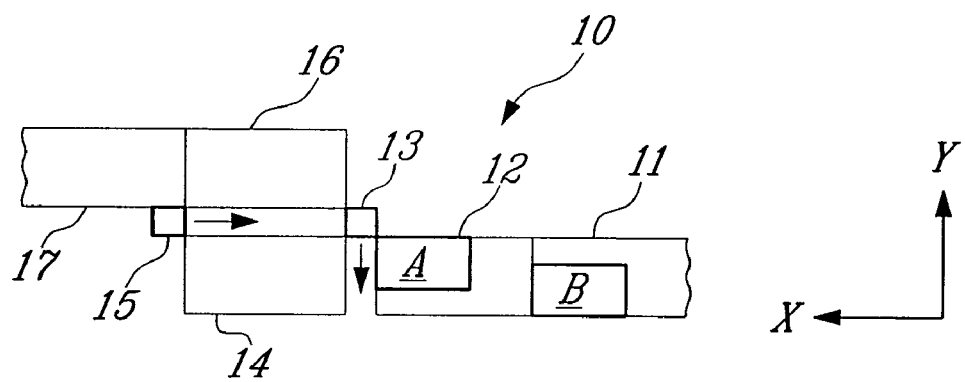
FIG. 1B is a schematic plan view of the apparatus of FIG. 1A, with a panel A on a first table.

Referring to FIG. 1B, the apparatus 10 is shown with panels A and B initiating a treatment sequence. More specifically, the panel A is positioned on the first table 12, after being fed from the upstream conveyor 11. The upstream conveyor 11 and the first table 12 have conveyed the panel A to a predetermined position (e.g., aligned along the X and Y axes on the first table 12).

The panel A is temporarily secured to this predetermined position, whereby the Y-axis tool 13 is displaced along the Y axis and actuated in order to treat the front edge surface of the panel A. The panel B simultaneously makes its way to the predetermined position on the first table 12.

Figure 1C:
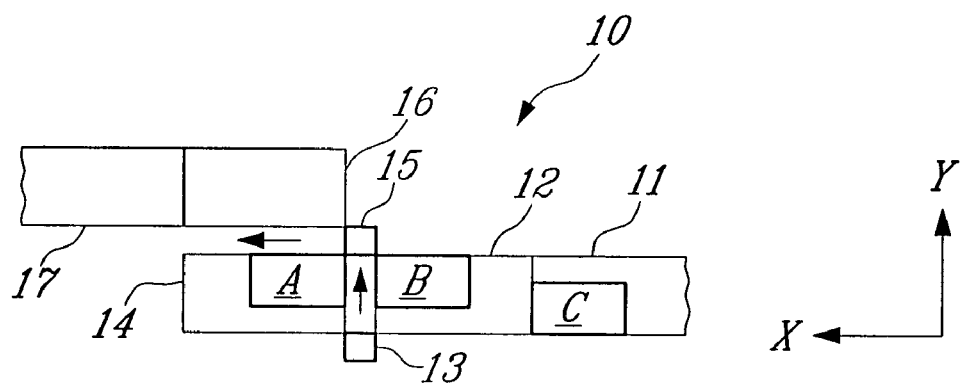
FIG. 1C is a schematic plan view of the apparatus of FIG. 1A, with the panel A on a second table.

Referring to FIG. 1C, the apparatus 10 is shown with panels A and B further in the sequence and respectively on the second table 14 and the first table 12, with both the panels A and B temporarily secured to their respective tables 14 and 12 in aligned positions.

Accordingly, the Y-axis tool 13 is displaced along the Y axis and actuated in order to treat the rear edge surface of the panel A and the front edge surface of the panel B. Due to the position of the panels A and B on either sides of the tool 13, the tool 13 treats both edge surfaces simultaneously. The panel C simultaneously makes its way to the predetermined position on the first table 12.

Moreover, a first lateral edge surface of the panel A is treated by the X-axis tool 15. The X-axis tool 15 is displaced along the X axis and actuated in order to treat the first lateral edge surface of the panel A. As shown in FIG. 1C, the tool 15 moves away from the path of the tool 13, while the tool 13 moves toward the path of the tool 15. This enables both tools to be displaced simultaneously within a confined space. Moreover, two edge surfaces of panel A can be treated simultaneously, and this results in an accelerating of the treatment process.

Figure 1D:
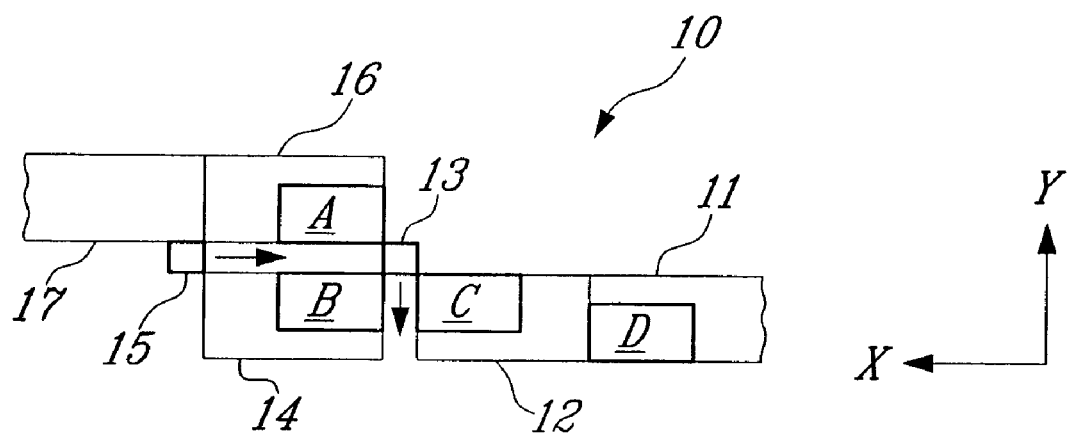
FIG. 1D is a schematic plan view of the apparatus of FIG. 1A, with the panel A on a third table.

Referring to FIG. 1D, the apparatus 10 is shown with panels A, B and C further in the sequence and respectively on the third table 16, the second table 14 and the first table 12, with the panels A, B and C temporarily secured to their respective tables 16, 14 and 12, in aligned positions.

Accordingly, the X-axis tool 15 is displaced along the X axis and actuated in order to treat the second lateral edge surface of the panel A and the first lateral edge of the panel B. Due to the position of the panels A and B on either sides of the tool 15, the tool 15 treats both edge surfaces simultaneously.

The Y-axis tool 13 is displaced along the Y axis and actuated in order to treat the rear edge surface of the panel B and the front edge surface of the panel C, with both edge surfaces being treated simultaneously as described previously. The panel D simultaneously makes its way to the predetermined position on the first table 12.

By the previously described simultaneous actuation of the tools 13 and 15, a total of four edge surfaces on three different panels are treated simultaneously, resulting in an optimized treatment process.

Figure 1E:
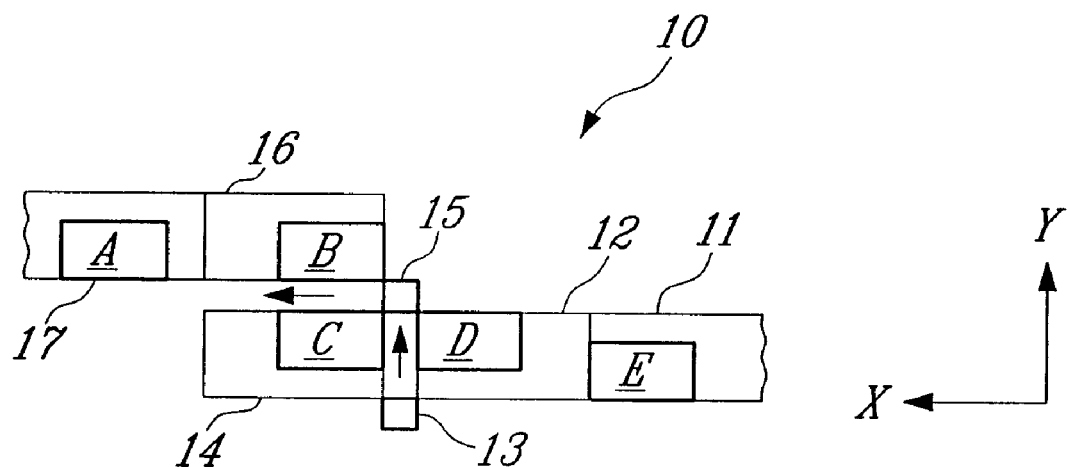
FIG. 1E is a schematic plan view of the apparatus of FIG. 1A, with the panel A on a downstream conveyor.

Referring to FIG. 1E, the panel A, having all eight edges of its edge surfaces treated, is on the downstream conveyor 17. Panels B and C are on opposite sides of the tool 15, for the treatment of the second lateral edge surface and the first lateral edge surface, respectively. Panels C and D are on opposite sides of the tool 13, for the treatment of the rear edge surface and the front edge surface, respectively. Panel E is simultaneously being fed from the upstream table 11 to the first table 12, for treatment of its edges in the apparatus 10.

The apparatus 10 of the preferred embodiment enables the rate of treatment of panels to be accelerated by its configuration, considering that two edge surfaces (of subsequent panels) are treated simultaneously. Moreover, having the panels cross over the axis of displacement of both the Y-axis tool 13 and the X-axis tool 15 enables edge treatment to be performed on all four edges surfaces, and potentially eight edges, within a limited space.

Alternatively, the second table 14 could be provided with a suitable conveyor system to rotate panels after being treated by the first tool 13. In such an embodiment, the tables 14 and 16 could be positioned in end-to-end relation, rather than in a side-by-side relation as illustrated in FIGS. 1A to 1E.

It is pointed out that the apparatus 10 is not limited to treating a single dimension of panels. The panels A to E of FIGS. 1B to 1E are all illustrated as having the same dimensions, but could be of different dimensions. Sensors, such as motion detectors, are placed as a function of the predetermined positions of the panels with respect to tables 12, 14 and 16, to stop the displacement of the panels in proper X and Y axis alignment.

Now that the sequence of edge treatment operation for the apparatus 10 has been described, the various components of the apparatus 10 will be described.

Figure 3:
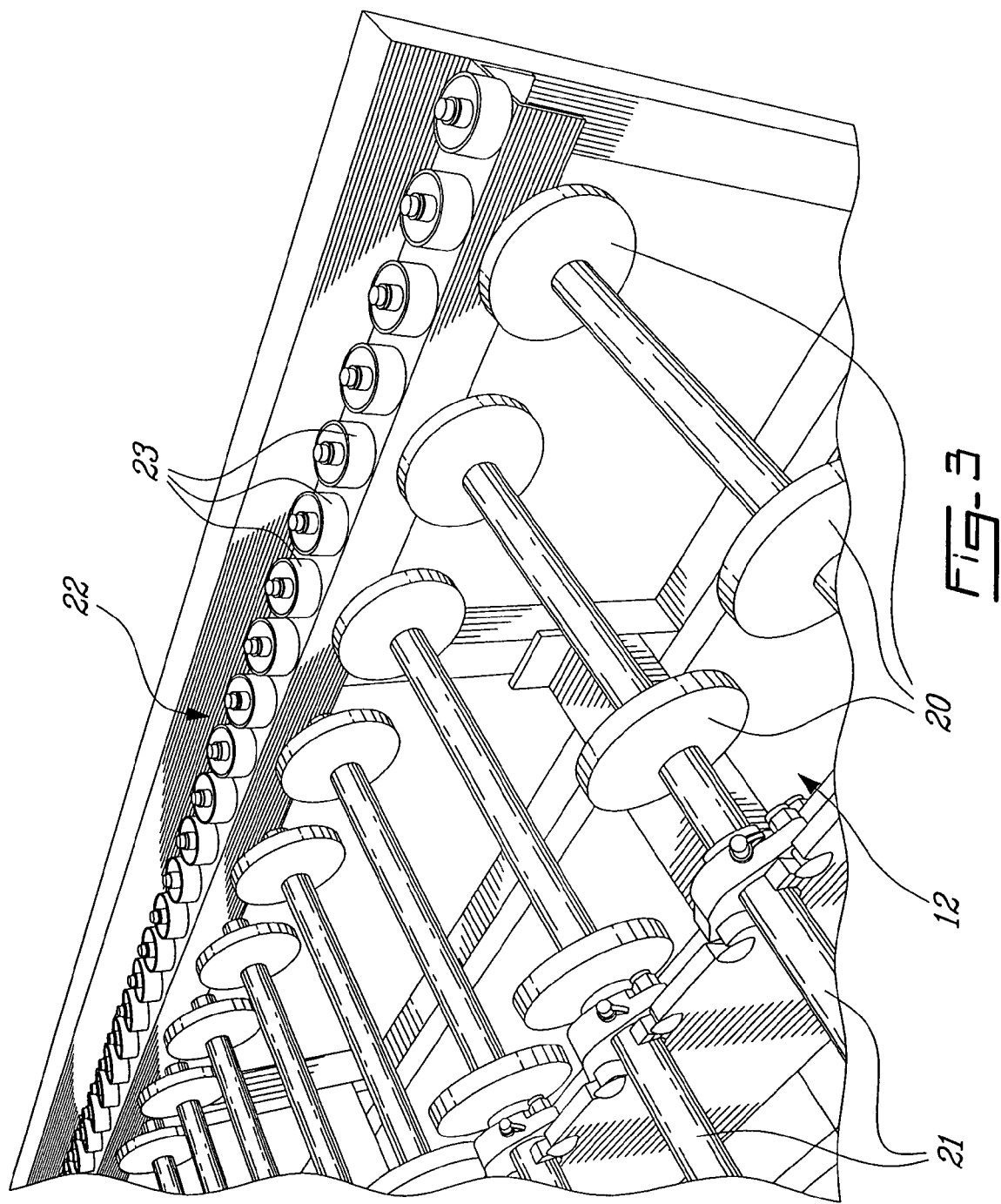
FIG. 3 is an enlarged perspective view of rollers and an alignment rail of the first table of FIG. 2.

Referring concurrently to FIGS. 2 and 3, the first table 12 is shown in greater detail, with the upstream conveyor 11 being removed for clarity purposes.

As described previously, the panels are conveyed on the first table 12 to an aligned position adjacent to the second table 14. Accordingly, the first table 12 is provided with rollers 20, spaced apart on shafts 21. The shafts 21 are actuated so as to displace a panel on the rollers 20 toward the second table 14. It is pointed out that a few or all the rollers 20 may be actuated.

The first table 12 is also provided with an alignment rail 22. The alignment rail 22 has a plurality of idle rollers 23 having their rotational axes generally vertical.

In order to direct the panels reaching the first table 12 toward the alignment rail 22, the first table 12 is optionally slightly inclined such that panels on the rollers 20 move progressively toward an abutting contact with the rollers 23 of the alignment rail 22 by the effect of gravity. Alternatively, the shafts 21 may be oriented so as to cause the displacement of the panels toward the alignment rail 22. For instance, the shafts 21 all lie in a common plane generally parallel to the ground, but are each at an angle of more than 90 degrees with respect to the alignment rail 22. For instance, an angle of 92 to 94 degrees will cause the panels being displaced on the table 12 to come into abutment with the alignment rail 22.

In order to treat the panel on the first table 12, the panel has to reach the aligned position on the first table 12. The panel reaching the downstream end of the table 12 (i.e., adjacent to the second table 14) will be in abutment with the alignment rail 22, and thus aligned in the Y-axis direction. As the panel moves toward the edge of the first table 12, a sensor (not visible) will visual detect the panel reaching a desired X-axis position and hence stop the displacement of the panel.

Figure 4:
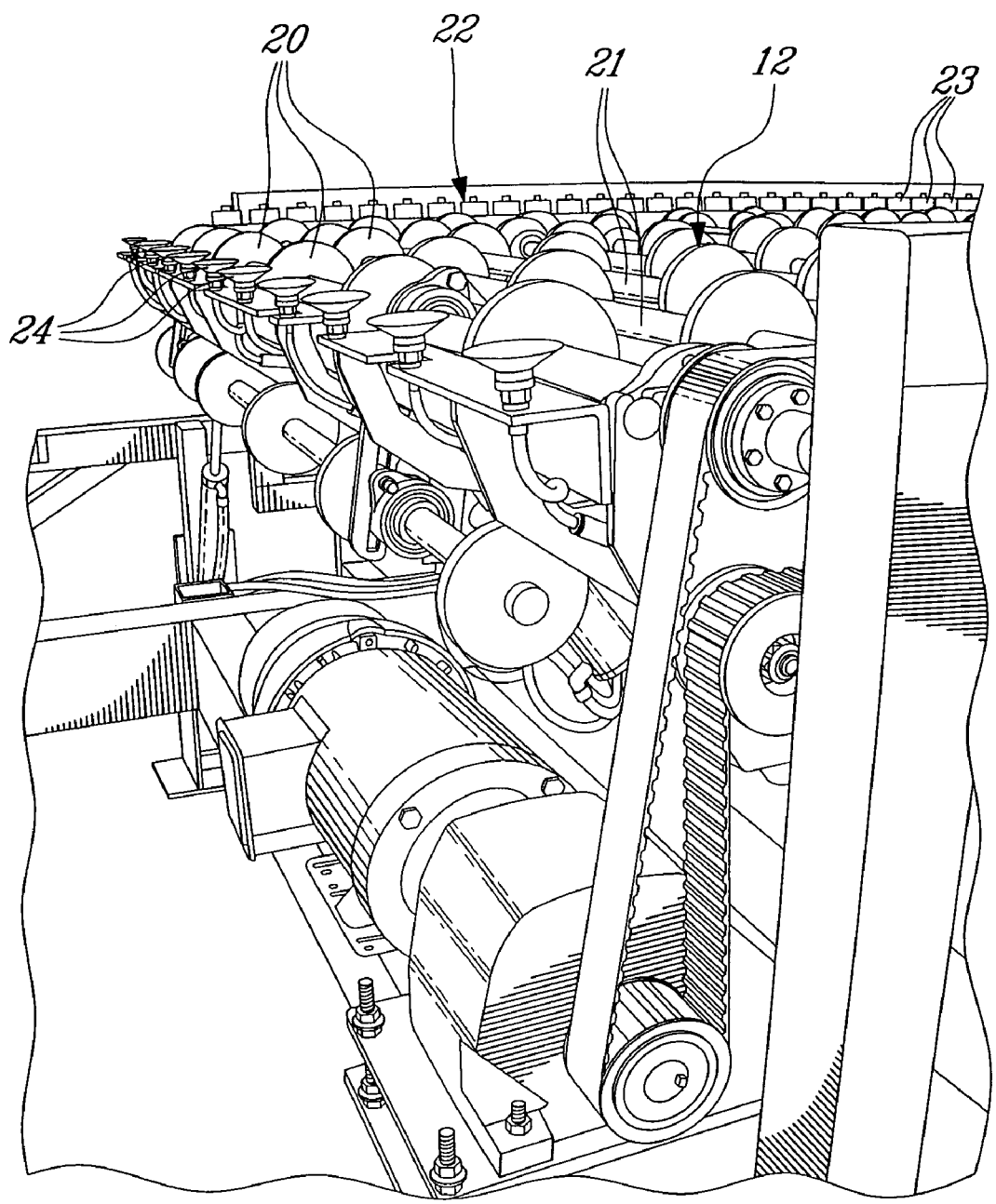
FIG. 4 is a perspective view of a downstream end of the first table of FIG. 2.

In the embodiment illustrated in FIG. 4, securing devices such as suction cups 24 will be raised to come into contact with the panel, so as to secure the panel in the aligned position. The suction cups are typically connected to a vacuum source, so as to effectively secure the panel. It is contemplated to provide other types of securing devices, such as mechanical stops and the like, that will enable to stop the panels in desired alignment.

Figure 5:
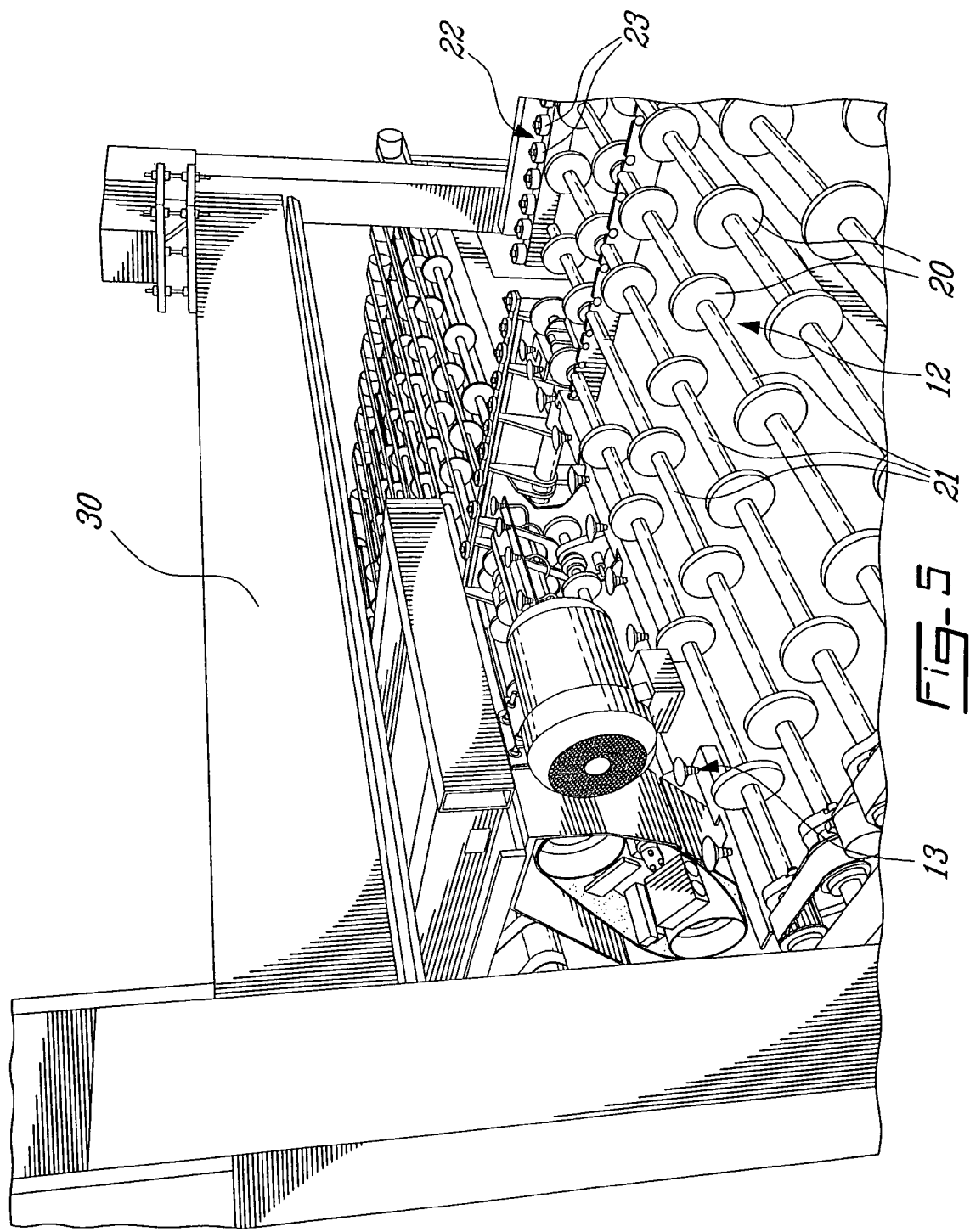
FIG. 5 is a perspective view of a sanding tool hanging above the first table of FIG. 2.

Once the panel is in the aligned position on the first table 12, the edge surface of the panel may be treated. Referring to FIG. 5, the Y-axis tool 13 is generally illustrated. In the described embodiment, the edges of the panels are sanded to a smoother finish, whereby the tool 13 uses an abrasive. Alternatively, the tools 13 and 15 could be of other varieties to provide different treatments to the edges, such as the application of a product on the edges.

The tool 13 is supported by a frame 30, such that the tool 13 is displaceable between the first table 12 and the second table 14, as illustrated by directions V1 (i.e., along the Y axis).

Figure 6:
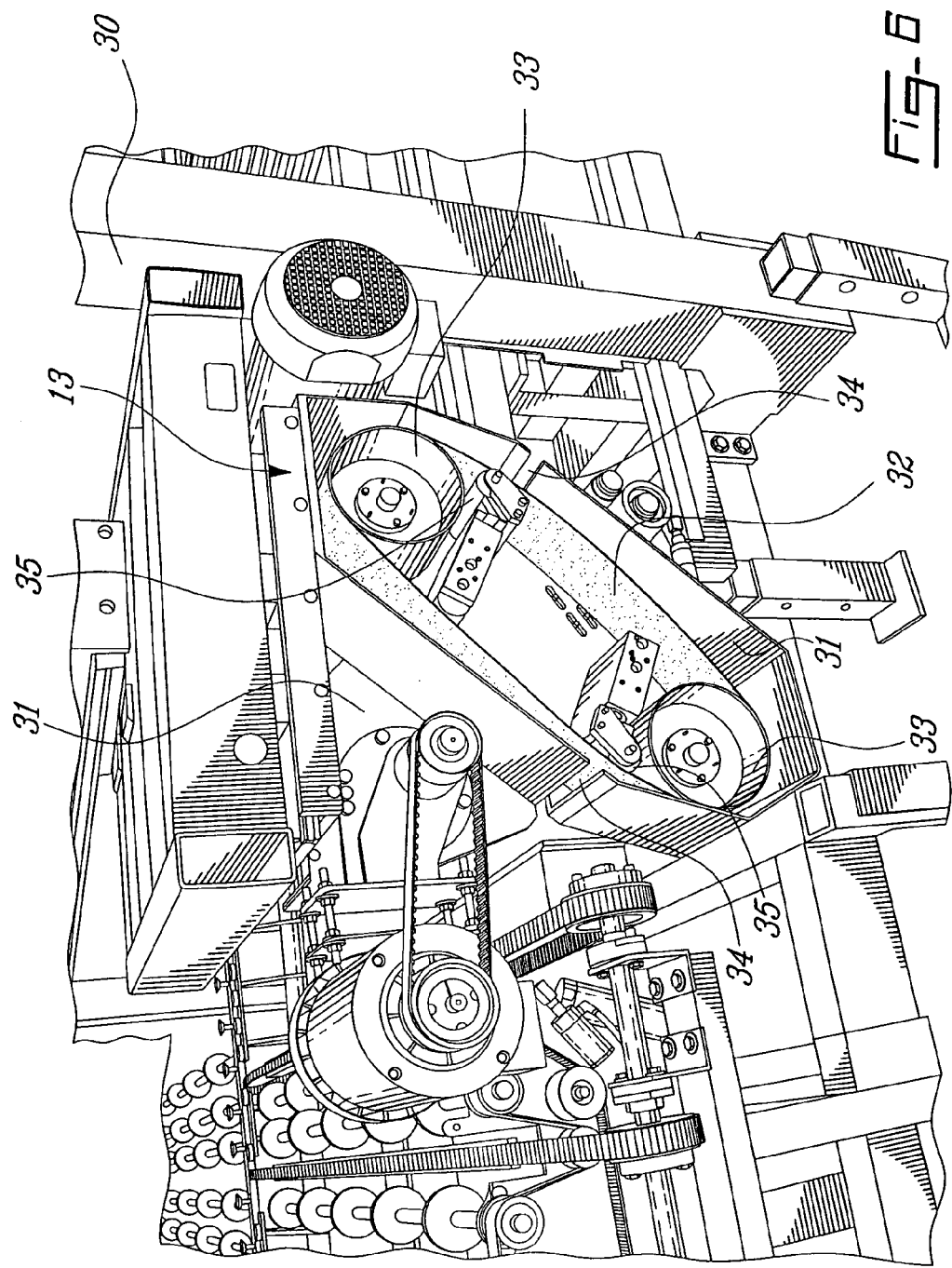
FIG. 6 is a perspective view of the sanding tool, from a lateral viewpoint.

Referring to FIG. 6, the tool 13 of the illustrated embodiment has a pair of casings 31, positioned with respect to one another to form an X shape. The interior of one of the casings 31 is visible in FIG. 6, as a cover thereof has been removed to expose the interior. In each of the casings 31, a band of abrasive 32 is stretched between a pair of wheels 33. The wheels 33 cause the band 32 to move in a cyclical motion. Although a band of abrasive is illustrated, another embodiment has grinding wheels as abrasive tool to grind the edges of the panels. One or two grinding wheels could be used by casing, and therefore two to four grinding wheels per tool.

Figure 7:
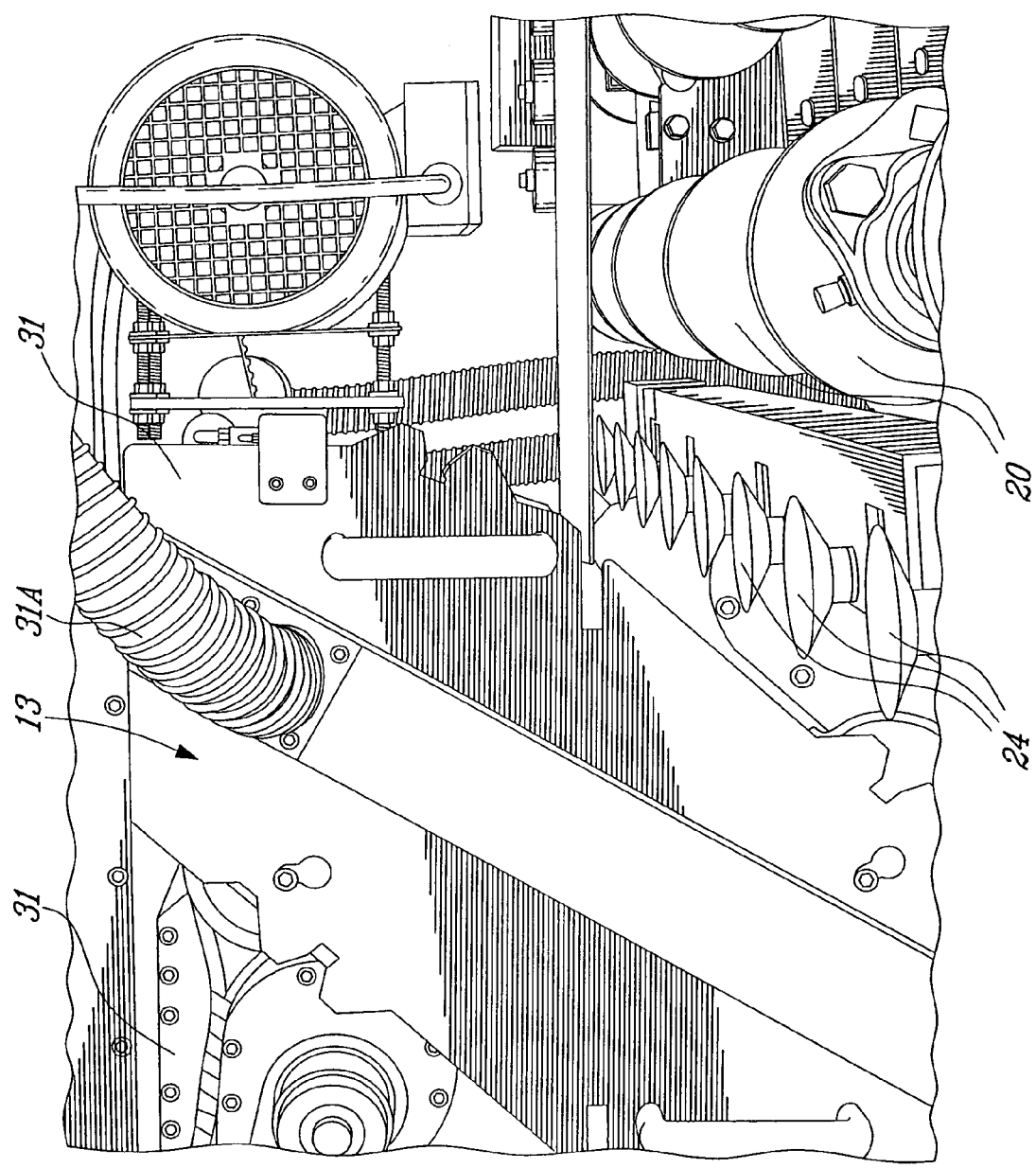
FIG. 7 is a perspective view of the sanding tool, during treatment of an edge of a panel on the first table of FIG. 2.

A pair of slots 34 are provided in both sides of each casing 31, and are vertically aligned such that the edge surface of the panels (on both the first table 12 and the second table 14) can be received and come into contact with the actuated band of abrasive 32 so as to be treated (FIG. 7). Pressure inducing members 35 are provided to press the band 32 against the edge of the panels being treated.

The casing 31 whose interior is shown in FIG. 6 will sand an upper edge of the panel on the first table 12, and a lower edge of the panel on the second table 14. Accordingly, the other casing 31 is reversed so as to sand the upper edge of the panel on the second table 14, and the lower edge of the panel on the first table 12. Accordingly, the two edges of each edge surface are treated by a single pass of the Y-axis tool 13.

The displacement of the tool 13 along the Y axis (FIGS. 1A to 1E) will permit the treatment over the full length of the edge surface.

Once the front edge surface of the panel resting on the first table 12 has been treated, the panel is transferred to the second table 14. As shown in FIG. 7, a conduit 31A is in fluid communication with the interior of the casing 31, so as to vacuum away dust residue resulting from the sanding performed by the tool 13.

Figure 8:
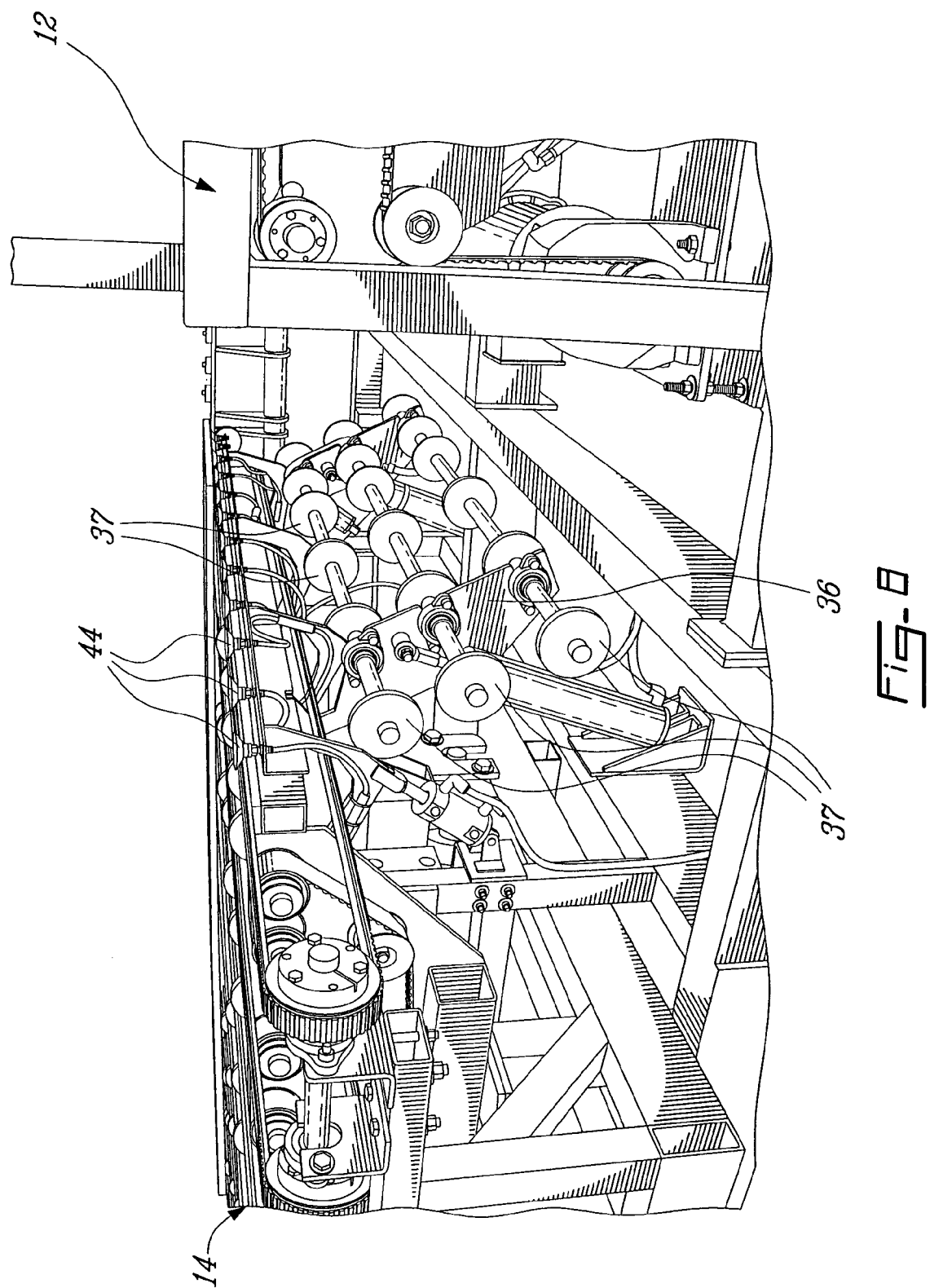
FIG. 8 is a perspective view of an upstream end of a second table of the apparatus of FIG. 1A, showing a bridge member in a retracted position.
Figure 9:
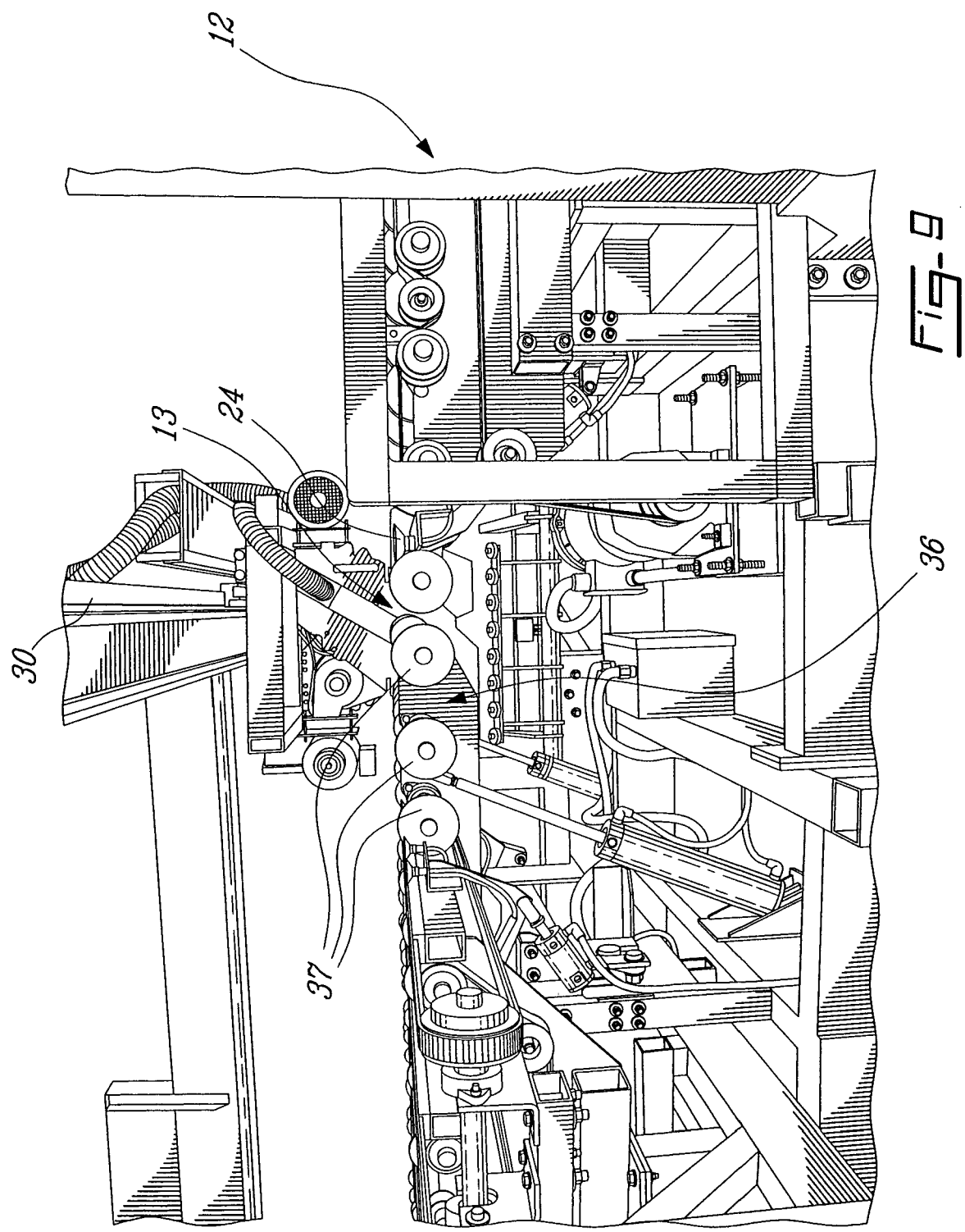
FIG. 9 is a perspective view of the first and second table, with the bridge member in the bridging position.

Referring to FIGS. 8 and 9, bridge members 36 are optionally provided between the first table 12 and the second table 14. It is considered to use the bridge members 36 with panels that are too short to be transferred over the gap between the first table 12 and the second table 14.

Accordingly, the bridge members 36 are displaceable from a retracted position (FIG. 8), to a bridging position (FIG. 9), to support panels being transferred from the first table 12 to the second table 14. The bridge members 36 are provided with rollers 37.

It is pointed out that the retracted position of the bridge members 36 is such that the Y-axis tool 13 is free to move between the tables 12 and 14 when treating a panel.

Figure 10:
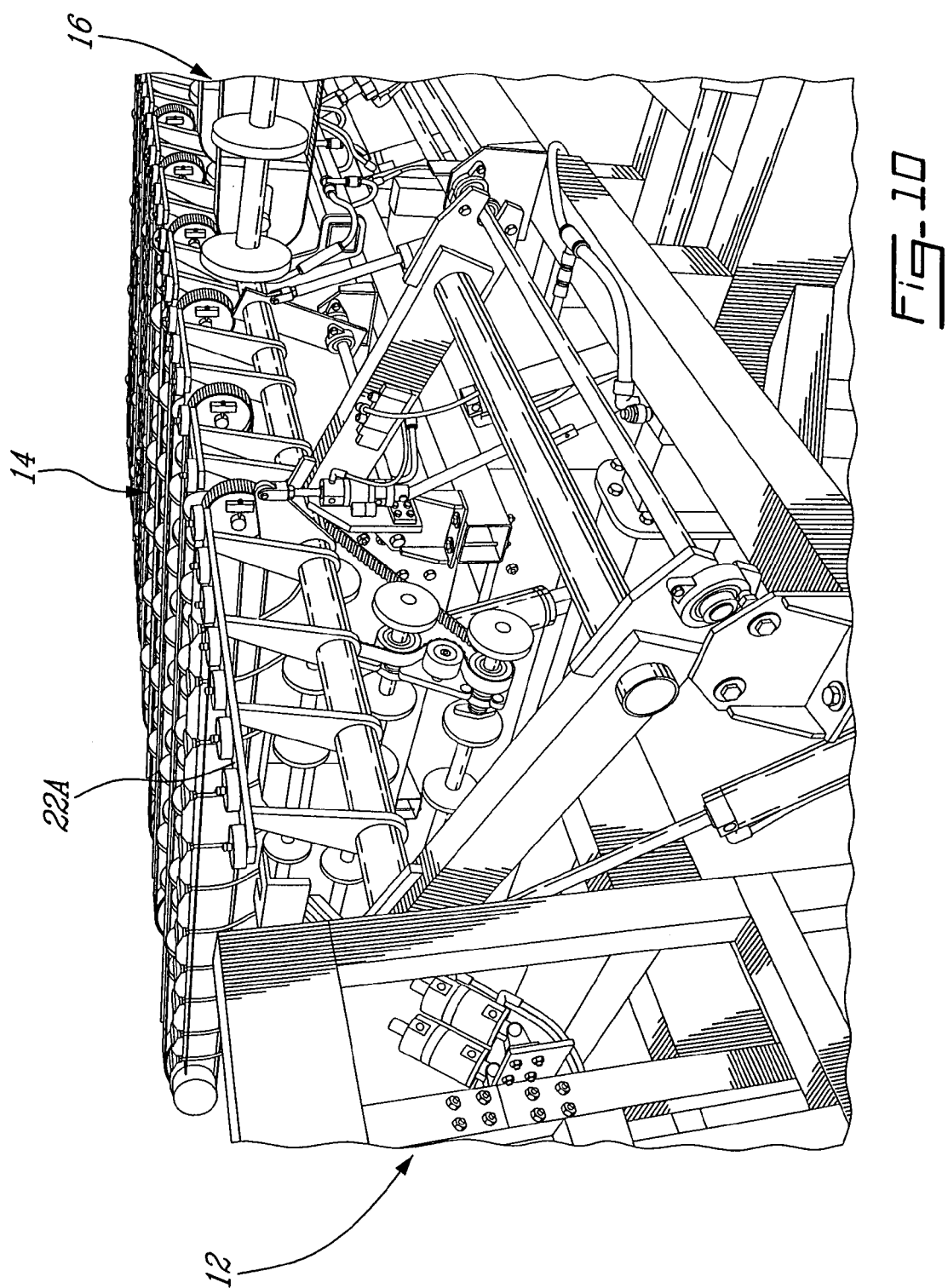
FIG. 10 is a perspective view of a collapsible portion of the alignment rail of the first table of FIG. 2.

Similarly, referring to FIG. 10, a portion 22A of the alignment rail 22 is collapsible, so as not to impede movement of the Y-axis tool 13 and/or the X-axis tool 15.

Figure 11:
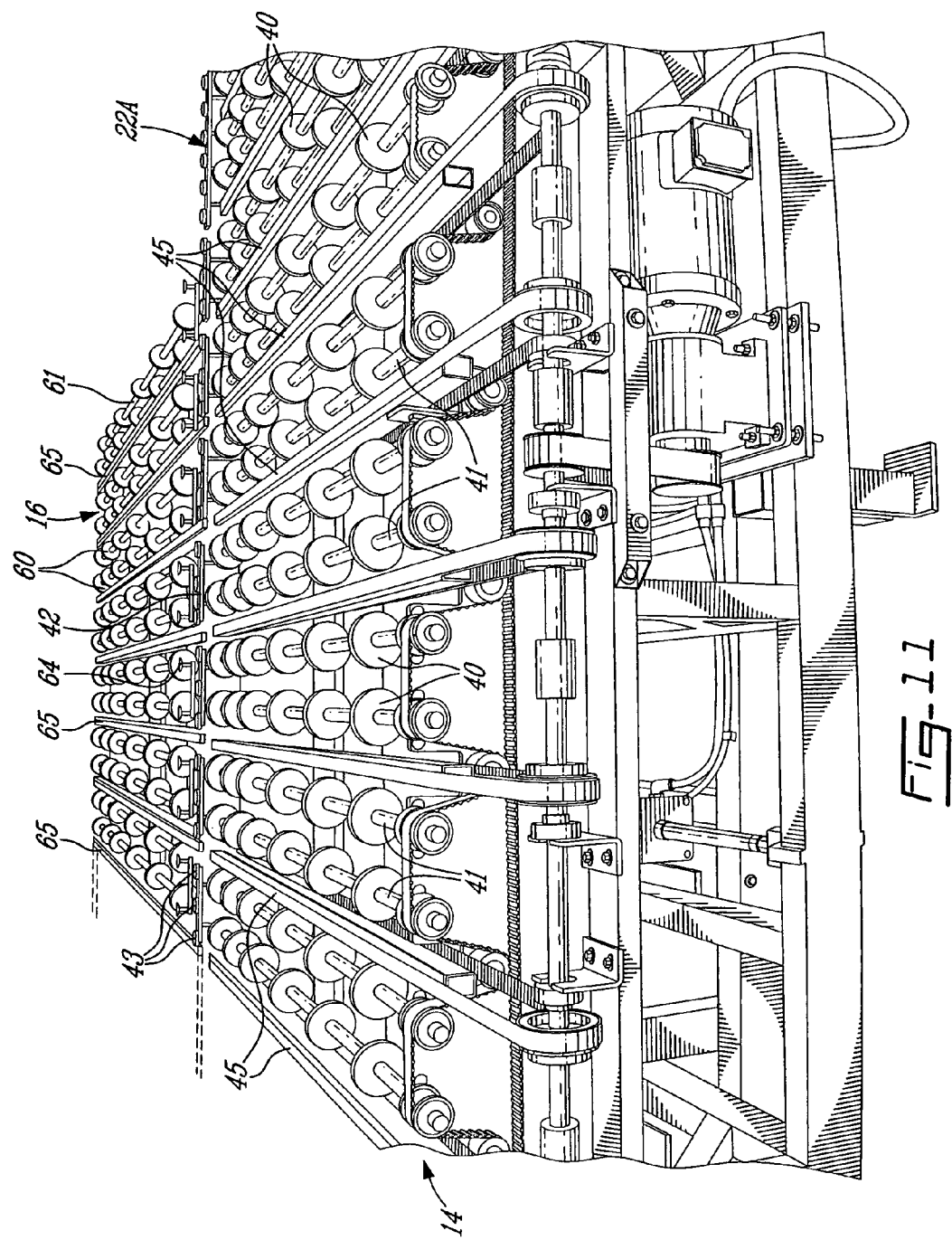
FIG. 11 is a perspective view of the second table and a third table of the apparatus of FIG. 1.
Figure 12:
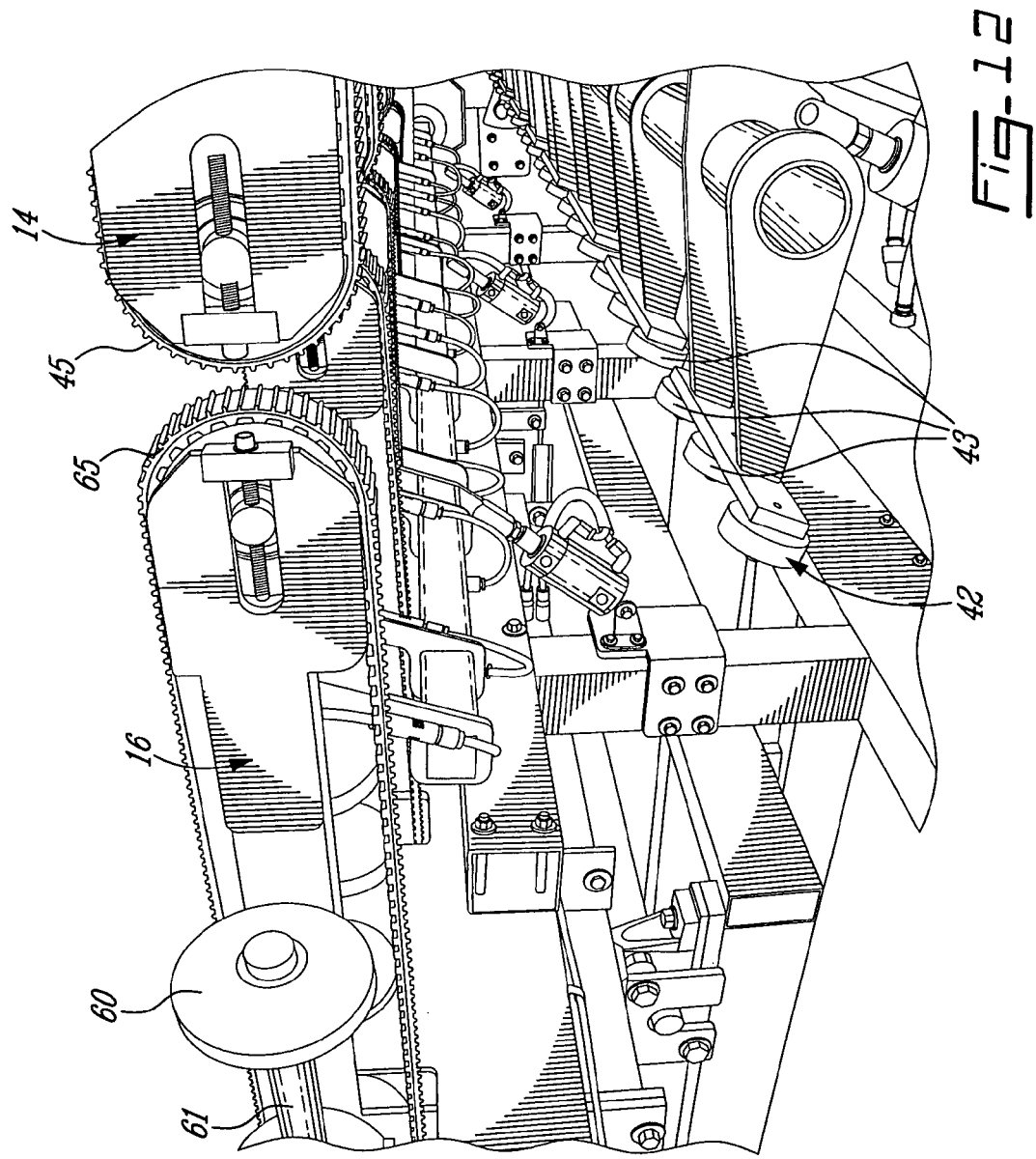
FIG. 12 is an enlarged perspective view of the second table and third table of FIG. 11, in position for the transfer of a panel from the second table to the third table.

Referring to FIG. 11, the second table 14 is similar to the first table 12 in that it has rollers 40 on actuated shafts 41. As seen in FIGS. 10 and 12, the second table 14 is provided with a collapsible alignment rail 42. The alignment rail 42 has idle rollers 43, for the abutment thereon of a panel reaching the second table 14 in Y-axis alignment.

Referring to FIG. 8, the second table 14 has suction cups 44, such that a panel reaching the second table 14 can be secured thereto in an aligned position. Once the panel is secured in the aligned position, the tool 13 can be used to treat the rear edge surface of the panel. The suction cups 44 are typically connected to a vacuum source, so as to effectively secure the panel. The actuation of the suction cups 44 is associated with the detection of the presence of a panel on the second table 14, in the X-axis aligned position. The suctions cups 44, are raised to come into contact with the panel, and retracted once the edges have been treated to allow displacement of the panels between the tables 14 and 16. The aligned position has the panel abutted against the alignment rail 42 for Y-axis alignment, and the rear edge of the panel in alignment with the path of operation of the tool 13.

Once panels are releasably secured to the tables 12 and 14 (e.g., FIG. 1C), the tool 13 is displaced and actuated to treat simultaneously the respective edge surfaces, as described previously.

As shown in FIG. 12, the alignment rail 42 is collapsible so as to expose a first lateral edge surface for edge treatment, and to enable the transfer of the panels from the second table 14 to the third table 16 upon completion of the treatment. In FIG. 12, the alignment rail 42 is shown in its retracted position.

Accordingly, once the panel on the second table 14 has reached the aligned position, the alignment rail 42 is retracted, such that both the rear edge surface of the panel and a first of its lateral edge surfaces are treated by the tools 13 and 15, respectively.

The X-axis tool 15 is essentially similar to the Y-axis tool 13, but is displaceable along the X axis (FIGS. 1A to 1E), to treat the lateral edge surfaces of the panels. By the X shape of the X-axis tool 15 (as explained for the Y-axis tool 13), the X-axis tool 15 can treat one panel on each of tables 14 and 16 simultaneously, and thus all four edges in one pass. Moreover, the tools 13 and 15 can be actuated simultaneously as described previously, whereby eight edges can be treated in one single sequence.

In the illustrated embodiment, the second table 14 is equipped with a second conveyor system, in addition to the rollers 40 which represent the first conveyor system. The rollers 40 actuate the displacement of the panel in the X axis, whereas the second conveyor system displaces the panels in the Y axis, for the transfer of the panels from the second table 14 to the third table 16.

The second conveyor system consists of, for instance, an endless conveyor having belts 45 that are vertically displaceable between a retracted position (i.e., below the plane of the rollers 40) and an exposed position (i.e., above the plane of the rollers 40).

Therefore, once a panel has been treated on the second table 14 (i.e., its rear edge and a first of its lateral edges), the belts 45 are raised to support the panel. Referring to FIG. 12, it is shown that the belts 45 can be displaced toward the third table 16, so as to bridge the gap between the second table 14 and the third table 16.

As shown from FIGS. 11 and 12, the third table 16 is essentially similar to the second table 14, in that it has rollers 60 on shafts 61 for displacement of panels in the X axis. Suction cups 64, retractable vertically, are provided on the third table 16, adjacent to the second table 14, to secure panels on the third table 16 in an aligned position.

Belts 65 of an endless conveyor are provided to displace panels in the Y-axis direction, when a panel is transferred from the second table 14 to the third table 16. The belts 65 are displaceable vertically, such that the belts 65 can be retracted below the plane of the rollers 60 when the panel has been treated on the third table 16.

As shown in FIG. 12, the belts 65 are displaceable in the Y-axis direction toward the second table 14, to close the gap between the second table 14 and the third table 16 when a panel is transferred between tables.

Upon reaching the third table 16, the suction cups 64 will secure the panel in an aligned position by way of sensors actuating the suction cups 64. As the belts 45 and 65 are returned to their initial position to clear the gap between the tables 14 and 16, the tool 15 may be used to treat the edges of the panels on the tables 14 and 16 simultaneously.

Once the edges of the panels have been treated, the panel is directed toward the downstream conveyor 17 (FIGS. 1A to 1E).

It is pointed out that the Y-axis tool 13 and/or the X-axis tool 15 may be displaceable in two degrees of translation (i.e., X axis or Y axis) in instances where the tools 13 and 15 would come into contact with panels on any one of the tables 12, 14 and/or 16.

The apparatus 10 causes an efficient treatment of edges of the panels. In order to synchronize the operation of all components of the apparatus 10 to ensure efficient treatment of the panels, it is considered to equip the apparatus 10 with a controller, such as a processing unit, that will actuate all components in accordance with the sequence of operation of the apparatus 10.

The invention claimed is:

1. An apparatus for sanding edges of a pair of panels, with the panels being spaced apart with respective edge surfaces generally parallel, the apparatus comprising:

a casing system sized so as to move along a path between the panels and having openings for receiving edge surfaces of panels therein;

a first abrasive tool within the casing system, the first abrasive tool inclined with respect to the panels and actuatable in cyclical motion so as to contact a first-face edge of a first panel and a second-face edge of a second panel in the casing system;

a second abrasive tool within the casing system and obliquely positioned with respect to the first abrasive band, the abrasive tool being actuatable in cyclical motion so as to contact a second-face edge of the first panel and a first-face edge of the second panel in the casing system; and an actuator to displace the apparatus along the edges of the panels to sand the edges longitudinally.

2. The apparatus according to claim 1, wherein the panels lie in a common plane, whereby the openings in the casing systems are all aligned with the common plane.

3. The apparatus according to claim 2, wherein the casing system, has two separate casings, with a casing for each of the abrasive tools.

4. The apparatus according to claim 1, wherein the abrasive tools are abrasive bands, with pressure inducer devices being positioned within the abrasive bands opposite the edges of the panels so as to pressurize the respective abrasive bands against the edges of the panels being treated.

5. The apparatus according to claim 1, further comprising a vacuum system associated with the casing system so as to remove dust from the casing system resulting from the treatment of the panels.

* * * * *